(12) United States Patent
Lee et al.

(10) Patent No.: US 12,274,902 B2
(45) Date of Patent: Apr. 15, 2025

(54) BATTERY MODULE COMPRISING ABSORPTION MEMBER, BATTERY RACK COMPRISING SAME, AND POWER STORAGE SYSTEM

(71) Applicant: LG ENERGY SOLUTION, LTD., Seoul (KR)

(72) Inventors: Jin-Kyu Lee, Daejeon (KR); Gi-Moon Gil, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 525 days.

(21) Appl. No.: 17/772,463

(22) PCT Filed: Jan. 7, 2021

(86) PCT No.: PCT/KR2021/000169
§ 371 (c)(1),
(2) Date: Apr. 27, 2022

(87) PCT Pub. No.: WO2021/145605
PCT Pub. Date: Jul. 22, 2021

(65) Prior Publication Data
US 2022/0355136 A1 Nov. 10, 2022

(30) Foreign Application Priority Data
Jan. 13, 2020 (KR) .................... 10-2020-0004377

(51) Int. Cl.
H01M 50/24 (2021.01)
A62C 2/06 (2006.01)
A62C 3/16 (2006.01)

(52) U.S. Cl.
CPC .............. *A62C 2/065* (2013.01); *A62C 3/16* (2013.01); *H01M 50/24* (2021.01)

(58) Field of Classification Search
CPC ........... A62C 2/065; A62C 3/16; A62C 35/13; A62C 37/44; A62C 2/06; A62C 35/68;
(Continued)

(56) References Cited

U.S. PATENT DOCUMENTS

2012/0219839 A1    8/2012   Kritzer et al.
2012/0312562 A1   12/2012   Woehrle et al.
(Continued)

FOREIGN PATENT DOCUMENTS

CN    107275715 A    10/2017
CN    108028334 A     5/2018
(Continued)

OTHER PUBLICATIONS

International Search Report for PCT/KR2021/000169 (PCT/ISA/210) mailed on Apr. 26, 2021.
(Continued)

*Primary Examiner* — Lisa S Park
(74) *Attorney, Agent, or Firm* — Birch, Stewart, Kolasch & Birch, LLP (57) ABSTRACT

A battery pack reduces the risk of secondary ignition or explosion. The battery module includes at least two cell assemblies, each having a plurality of secondary batteries; a module housing having an inner space formed to accommodate the at least two cell assemblies therein; and an absorption member interposed between the at least two cell assemblies and configured to absorb a fire extinguishing liquid when contacting the fire extinguishing liquid supplied into the module housing.

10 Claims, 7 Drawing Sheets

(58) Field of Classification Search
CPC .... A62C 37/38; H01M 50/24; H01M 50/209; H01M 50/143; H01M 10/052; H01M 50/289; H01M 50/204; H01M 50/242; H01M 50/244; H01M 2220/10; Y02E 60/10

See application file for complete search history.

(56) References Cited

U.S. PATENT DOCUMENTS

| | | | |
|---|---|---|---|
| 2014/0014376 A1* | 1/2014 | Schaefer | A62C 5/033 |
| | | | 429/149 |
| 2014/0193685 A1 | 7/2014 | Lim | |
| 2015/0194643 A1 | 7/2015 | Smith et al. | |
| 2015/0270589 A1 | 9/2015 | Ejiri et al. | |
| 2015/0280190 A1 | 10/2015 | Ohshiba et al. | |
| 2017/0030696 A1 | 2/2017 | Bailey | |
| 2017/0190264 A1* | 7/2017 | Kim | H01M 50/242 |
| 2018/0248160 A1 | 8/2018 | Lee | |
| 2019/0044113 A1 | 2/2019 | Wagner et al. | |
| 2019/0334143 A1 | 10/2019 | Sugeno | |
| 2020/0287252 A1* | 9/2020 | Li | H01M 10/6552 |
| 2021/0060368 A1* | 3/2021 | Jiang | H01M 50/673 |

FOREIGN PATENT DOCUMENTS

| | | |
|---|---|---|
| CN | 207602663 U | 7/2018 |
| CN | 108417753 A | 8/2018 |
| EP | 2 843 727 B1 | 5/2018 |
| JP | 59-79964 A | 5/1984 |
| JP | 2010-211963 A | 9/2010 |
| JP | 2013-500801 A | 1/2013 |
| JP | 2013-93225 A | 5/2013 |
| JP | 2013-131428 A | 7/2013 |
| JP | 2013-229180 A | 11/2013 |
| JP | 2014-502000 A | 1/2014 |
| JP | 5390713 B2 | 1/2014 |
| JP | 6134120 B2 | 5/2017 |
| JP | 6252313 B2 | 12/2017 |
| JP | 2019-204637 A | 11/2019 |
| KR | 10-2009-0026648 A | 3/2009 |
| KR | 10-2013-0115989 A | 10/2013 |
| KR | 10-2015-0032027 A | 3/2015 |
| KR | 10-1730961 B1 | 4/2017 |
| KR | 10-2018-0007241 A | 1/2018 |
| KR | 10-2018-0107197 A | 10/2018 |
| KR | 10-2019-0082974 A | 7/2019 |
| KR | 10-2042577 B1 | 11/2019 |
| WO | WO 2018/131221 A1 | 7/2018 |

OTHER PUBLICATIONS

Extended European Search Report for European Application No. 21741796.3, dated May 13, 2024.

* cited by examiner

<SYNTHETIC FIBER BEFORE ABSORBING FIRE EXTINGUISHING LIQUID>

<SYNTHETIC FIBER AFTER ABSORBING FIRE EXTINGUISHING LIQUID>

BATTERY MODULE COMPRISING ABSORPTION MEMBER, BATTERY RACK COMPRISING SAME, AND POWER STORAGE SYSTEM

TECHNICAL FIELD

The present disclosure relates to a battery module having an absorption member, and a battery rack and an energy storage system including the battery module, and more particularly, to a battery pack that reduces the risk of secondary ignition or explosion. The present application claims priority to Korean Patent Application No. 10-2020-0004377 filed on Jan. 13, 2020 in the Republic of Korea, the disclosures of which are incorporated herein by reference.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. The lithium secondary battery includes an electrode assembly in which a positive electrode plate coated with the positive electrode active material and a negative electrode plate coated with the negative electrode active material are disposed with a separator being interposed therebetween, and an exterior, namely a battery pouch exterior, hermetically containing the electrode assembly together with an electrolyte.

Recently, secondary batteries are widely used not only in small devices such as portable electronic devices, but also in middle-sized or large-sized devices such as vehicles and energy storage devices. When used in such a middle-sized device, a large number of secondary batteries are electrically connected to increase capacity and output. In particular, pouch-type secondary batteries are widely used in such middle-sized and large-sized devices due to the advantage of easy stacking.

Meanwhile, recently, as the need for a large-capacity structure increases along with the use as an energy storage source, there is an increasing demand for a battery pack that includes a plurality of cell assemblies containing a plurality of secondary batteries electrically connected in series and/or in parallel, a battery module accommodating the plurality of cell assemblies therein, and a battery management system (BMS).

In addition, the battery pack generally includes an outer housing made of a metal material to protect or store a plurality of secondary batteries against an external shock. Meanwhile, the demand for high-capacity battery packs is increasing recently.

However, the conventional battery pack or rack includes a plurality of battery modules. Thus, if fire or thermal runaway occurs at any one cell assembly of each battery module, high temperature gas or flame may be transferred to other adjacent cell assemblies, so fire or thermal runaway may occur at other cell assemblies in series. Therefore, efforts to prevent secondary ignition or explosion are increasing.

For example, there is an urgent need to develop a technology capable of blocking heat so that heat generated by fire or thermal runaway is not transferred to other cell assemblies adjacent to the cell assembly where the fire or thermal runaway occurs.

In addition, a swelling phenomenon may occur according to charging and discharging of the cell assembly, and an internal side reaction (gas) may be generated along with the swelling phenomenon, so a technology capable of reducing the side reaction is required.

DISCLOSURE

Technical Problem

The present disclosure is designed to solve the problems of the related art, and therefore the present disclosure is directed to providing a battery module, which reduces the risk of secondary ignition or explosion.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:
  at least two cell assemblies, each cell assembly of the at least two cell assemblies having a plurality of secondary batteries;
  a module housing having an inner space formed to accommodate the at least two cell assemblies therein; and
  an absorption member interposed between the at least two cell assemblies and configured to absorb a fire extinguishing liquid when contacting the fire extinguishing liquid supplied into the module housing.

Also, the absorption member may include a synthetic fiber configured to absorb the fire extinguishing liquid.

Moreover, the synthetic fiber may cause volume expansion when absorbing the fire extinguishing liquid, and
  the synthetic fiber may be configured to contact an inner surface of an outer wall of the module housing due to the volume expansion.

Also, the secondary battery may be a pouch-type secondary battery, and
  the battery module may further comprise a pressing member that includes an elastic portion configured to elastically deform in length in both directions, and at least two pressing plates coupled to both ends of the elastic portion in both directions and configured to block expansion of the cell assembly.

Moreover, the absorption member may be located between the at least two pressing plates.

In addition, the absorption member may further include a guide plate configured to guide deformation of the absorption member according to the volume expansion of the synthetic fiber.

Further, the synthetic fiber may have a perforated hole so that a part of the elastic portion is located therethrough, and
  the pressing plate may have a fixing groove so that an end of the elastic portion is inserted therein.

Also, the absorption member may include:

a porous body having a porous and spongy form and configured to absorb the fire extinguishing liquid; and a plurality of absorption particles distributed inside the porous body and configured to absorb the fire extinguishing liquid.

In addition, in another aspect of the present disclosure, there is also provided a battery rack, comprising:

at least one battery module; and a fire extinguisher including a fire extinguishing tank configured to contain a fire extinguishing liquid therein, a pipe connected from the fire extinguishing tank to the at least one battery module to supply the fire extinguishing liquid, and a fire extinguishing valve configured to open an outlet when an internal gas of the battery module is heated over a predetermined temperature so that the fire extinguishing liquid is supplied from the fire extinguishing tank into the battery module.

Also, in another aspect of the present disclosure, there is also provided an energy storage system, comprising at least one battery rack.

Advantageous Effects

According to an embodiment of the present disclosure, since the battery module of the present disclosure includes the absorption member interposed between the at least two cell assemblies and configured to absorb the fire extinguishing liquid when contacting the fire extinguishing liquid supplied into the module housing, when the fire extinguishing liquid is supplied into the battery module due to fire or thermal runaway, the absorption member may absorb the fire extinguishing liquid, so the absorption member may form an insulation barrier capable of blocking the transfer of heat between the cell assemblies. That is, the absorption member may block heat transfer between the cell assemblies. Accordingly, even if fire or thermal runaway occurs in some secondary batteries of one cell assembly, it is possible to prevent fire or thermal propagation from occurring at other neighboring cell assemblies. By doing so, the safety of the battery module may be effectively increased.

Also, according to an embodiment of the present disclosure, since the pressing member is further provided to include the elastic portion configured to be elastically deformed in both directions and at least two pressing plates respectively coupled to both ends of the elastic portion in both directions and configured to block the expansion of the cell assembly, the pressing member may effectively prevent the cell assembly from expanding. Accordingly, it is possible to suppress the occurrence of side reactions at the cell assembly. That is, in the present disclosure, it is possible to extend the service life of the cell assembly by means of the pressing member.

In addition, according to an embodiment of the present disclosure, since the absorption member is positioned between the at least two pressing plates, the absorption member may stably maintain a state where the pressing plates are erect. Moreover, if volume expansion occurs as the absorption member absorbs the fire extinguishing liquid, the pressing plates may more strongly press the cell assembly at which thermal runaway occurs, thereby effectively blocking the expansion of the cell assembly and effectively reducing the progress of thermal runaway.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
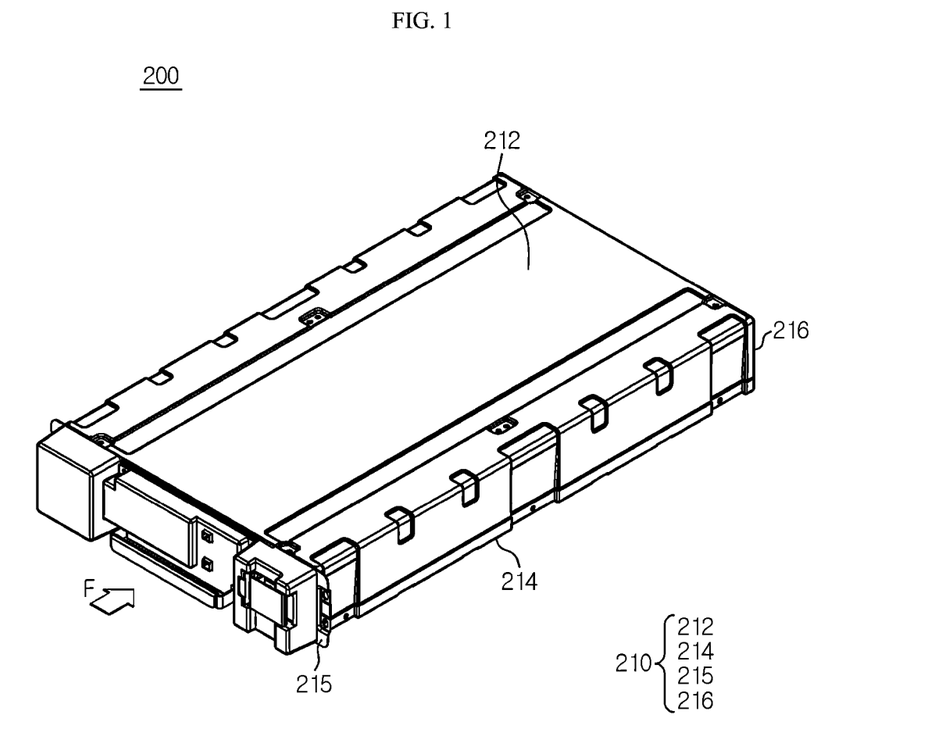
FIG. 1 is a perspective view schematically showing a battery module according to an embodiment of the present disclosure.
Figure 2:
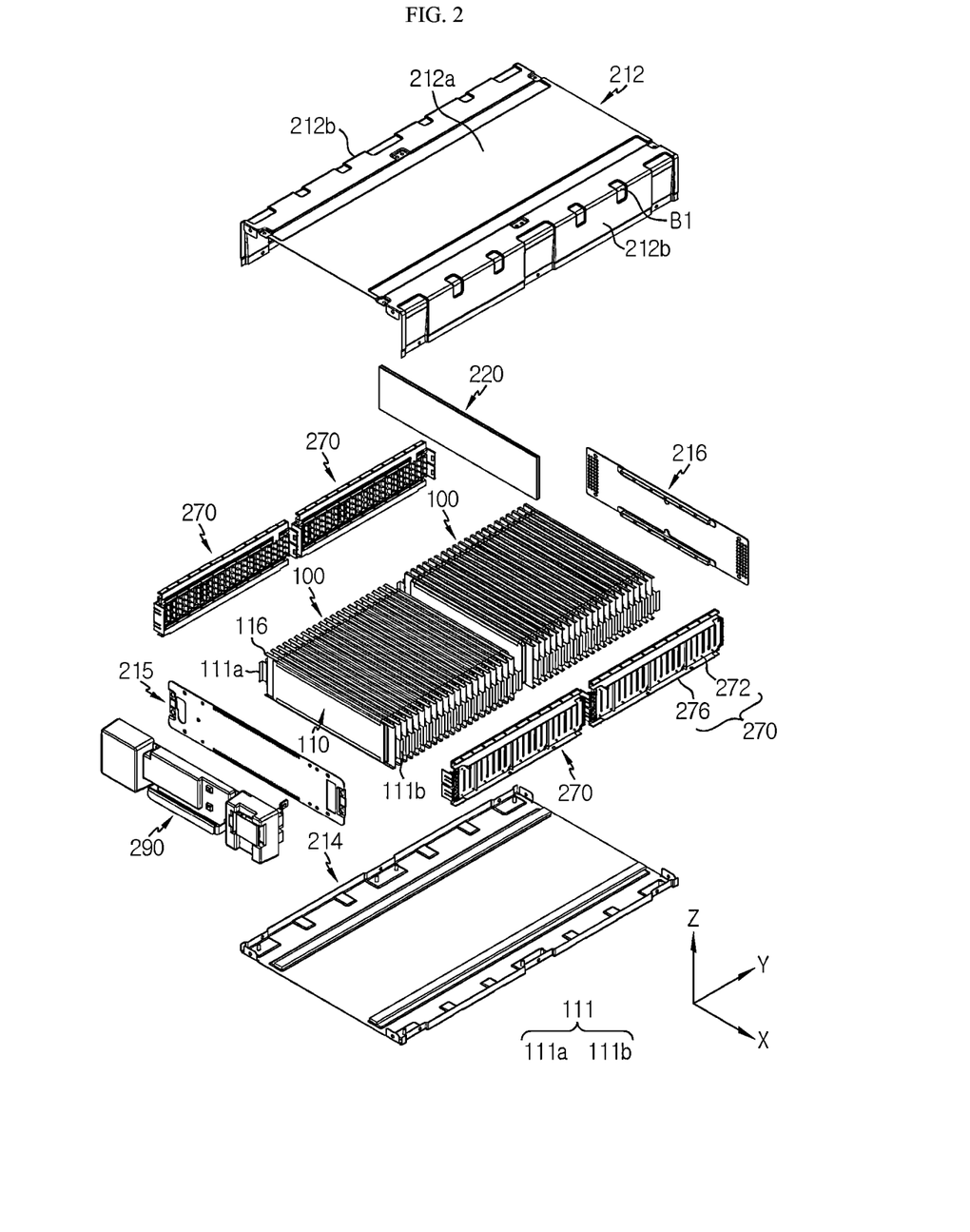
FIG. 2 is an exploded perspective view schematically showing components of the battery module according to an embodiment of the present disclosure.
Figure 3:
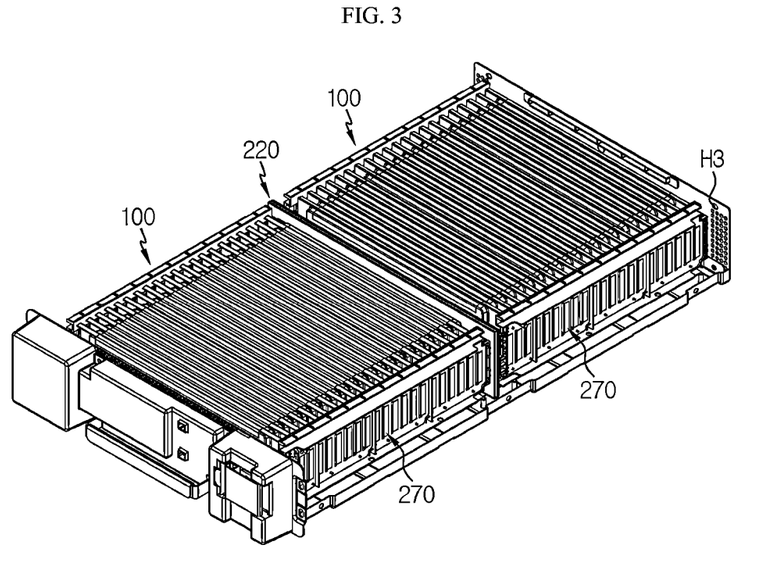
FIG. 3 is a perspective view schematically showing some components of the battery module according to an embodiment of the present disclosure.

FIG. 1 is a perspective view schematically showing a battery module according to an embodiment of the present disclosure. FIG. 2 is an exploded perspective view schematically showing components of the battery module according to an embodiment of the present disclosure. Also, FIG. 3 is a perspective view schematically showing some components of the battery module according to an embodiment of the present disclosure. In FIG. 3, the appearance of a battery module 200 excluding an upper cover 212 of a module housing 210 is depicted so that the inside of the battery module 200 may be observed. For reference, an X-axis arrow, a Y-axis arrow and a Z-axis arrow shown in FIG. 2 represent a left direction, a rear direction and an upper direction, respectively.

Referring to FIGS. 1 to 3, the battery module 200 according to an embodiment of the present disclosure may include at least two cell assemblies 100, a module housing 210, and an absorption member 220.

Here, the cell assembly 100 may include a plurality of secondary batteries 110 stacked on each other in a front and rear direction. The secondary battery 110 may be a pouch-type secondary battery 110. For example, as shown in FIG. 2, each of the two cell assemblies 100 may be configured such that 21 pouch-type secondary batteries 110 are stacked on each other side by side in a front and rear direction (Y direction).

In particular, the pouch-type secondary battery 110 may include an electrode assembly (not shown), an electrolyte (not shown), and a pouch 116. When viewed in the F direction (shown in FIG. 1), each secondary battery 110 may be disposed to be erect vertically (Z direction) on the ground so that two wide sides are located in front and rear directions and sealing portions are located in upper, lower, left and right directions. In other words, each secondary battery 110 may be configured to be erect in an upper and lower direction. Meanwhile, in this specification, unless otherwise specified, upper, lower, front, rear, left and right directions will be set based on when viewed in the F direction.

Here, the pouch may be configured to have an accommodation portion with a concave shape. In addition, the electrode assembly and the electrolyte may be accommodated in the accommodation portion. In addition, each pouch includes an outer insulation layer, a metal layer and an inner adhesive layer, and the inner adhesive layers may be adhered to each other at an edge of the pouch 116 to form a sealing portion. Further, a terrace portion may be formed at ends of the secondary battery 110 in a left and right direction (X direction), respectively, where a positive electrode lead 110a and a negative electrode lead 110b are formed.

In addition, the electrode assembly is an assembly of an electrode plate coated with an electrode active material and a separator, and at least one positive electrode plate and at least one negative electrode plate may be disposed therein with the separator being interposed therebetween. In addition, a positive electrode tab may be provided on the positive electrode plate of the electrode assembly, and at least one positive electrode tab may be connected to the positive electrode lead 111a.

Here, the positive electrode lead 111a has one end connected to the positive electrode tab and the other end exposed out of the pouch 116, and the exposed portion may function as an electrode terminal of the secondary battery 110, for example a positive electrode terminal of the secondary battery 110.

In addition, a negative electrode tab is provided on the negative electrode plate of the electrode assembly, and at least one negative electrode tab may be connected to the negative electrode lead 110b. Also, the negative electrode lead 110b may have one end connected to the negative electrode tab and the other end exposed out of the pouch 116, and the exposed portion may function as an electrode terminal of the secondary battery 110, for example a negative electrode terminal of the secondary battery 110.

Moreover, as shown in FIG. 1, when viewed in the F direction directly, the positive electrode lead 111a and the negative electrode lead 111b may be formed at left and right ends opposite to each other (in X direction) based on the center of the secondary battery 110. That is, the positive electrode lead 111a may be provided at one end (left end) based on the center of the secondary battery 110. In addition, the negative electrode lead 111b may be provided at the other end (right end) based on the center of the secondary battery 110.

For example, as shown in FIG. 2, each secondary battery 110 of the cell assembly 100 may be configured such that the positive electrode lead 111a and the negative electrode lead 111b protrude in left and right directions.

Here, terms indicating directions such as 'front', 'rear', 'left', 'right', 'upper' and 'lower' used in this specification may vary depending on the position of an observer or the form of a placed object. However, in this specification, for convenience of explanation, the directions such as 'front', 'rear', 'left', 'right', 'upper' and 'lower' are distinguishably expressed based on the case of being viewed in the F direction.

Therefore, according to this configuration of the present disclosure, in one secondary battery 110, there is no interference between the positive electrode lead 111a and the negative electrode lead 111b, thereby increasing the area of the electrode lead 111.

In addition, the positive electrode lead 111a and the negative electrode lead 111b may be configured in a plate shape. In particular, the positive electrode lead 111a and the negative electrode lead 111b may protrude in a horizontal direction (X direction) in a state where broad sides thereof are erect toward the front and rear direction.

Here, the horizontal direction may refer to a direction parallel to the ground when the secondary battery 110 is placed on the ground, and may also refer to at least one direction on a plane perpendicular to the upper and lower direction.

Further, the pouch-type secondary battery 110 may expand and contract in volume according to charging and discharging. That is, the entire volume of the cell assembly 100 including the plurality of secondary batteries 110 may expand and shrink according to charging and discharging.

However, the battery module 200 according to the present disclosure is not limited to the pouch-type secondary battery 110 described above, and various kinds of secondary batteries 110 known at the time of filing of this application may be employed.

In addition, the at least two cell assemblies 100 may be arranged in the front and rear direction. For example, as shown in FIG. 2, two cell assemblies 100 are arranged in the front and rear direction, and a predetermined distance may be provided between the two cell assemblies 100.

Meanwhile, the module housing 210 may have an inner space formed therein to accommodate the cell assembly 100. Specifically, the module housing 210 may include an upper cover 212, a base plate 214, a front cover 215, and a rear cover 216.

Specifically, the base plate 214 may have an area larger than the bottom surface of the at least two cell assemblies 100 so that the at least two cell assemblies 100 are mounted on the upper portion thereof. The base plate 214 may have a plate shape extending in a horizontal direction.

In addition, the upper cover 212 may include a top portion 212a and a side portion 212b. The top portion 212a may have a plate shape extending in a horizontal direction to cover the upper portion of the cell assembly 100. The side portion 212b may have a plate shape extending downward from both left and right ends of the top portion 212a to cover both left and right portions of the cell assembly 100.

In addition, the side portion 212b may be coupled to a portion of the base plate 214. For example, as shown in FIG.

2, the upper cover 212 may include a top portion 212a having a plate shape extending in front, rear, left and right directions. The upper cover 212 may include two side portions 212b extending downward from both left and right ends of the top portion 212a, respectively. Further, the lower ends of the two side portions 212b may be coupled to both left and right ends of the base plate 214, respectively. In this case, the coupling method may be male and female coupling or welding.

Further, the side portion 212b may be partially raised inward toward the secondary battery 110 to form a beading portion B1. For example, as shown in FIG. 2, eight beading portions B1 indented inward may be formed at one side portion 212b.

Moreover, the front cover 215 may be configured to cover the front portion of the plurality of secondary batteries 110. For example, the front cover 215 may have a plate shape larger than the front surface of the plurality of secondary batteries 110. The plate shape may be erect in the upper and lower direction.

Further, a portion of the outer periphery of the front cover 215 may be coupled with the base plate 214. For example, a lower portion of the outer periphery of the front cover 215 may be coupled to a front end of the base plate 214. Further, an upper portion of the outer periphery of the front cover 215 may be coupled to the front end of the upper cover 212. Here, the coupling method may employ bolt coupling.

In addition, the rear cover 216 may be configured to cover the rear portion of the cell assembly 100. For example, the rear cover 216 may have a plate shape larger than the rear surface of the plurality of secondary batteries 110.

In addition, a portion of the outer periphery of the rear cover 216 may be coupled with the base plate 214. For example, a lower portion of the outer periphery of the rear cover 216 may be coupled to the front end of the base plate 214. Further, an upper portion of the outer peripheral portion of the rear cover 216 may be coupled to the rear end of the upper cover 212. Here, the coupling method may employ bolt coupling.

Therefore, according to this configuration of the present disclosure, since the module housing 210 has a structure capable of stably protecting the plurality of secondary batteries 110 against external shocks, the safety of the battery module 200 against external shocks may be enhanced.

Meanwhile, the battery module 200 of the present disclosure may further include a module BMS 290 configured to control charging and discharging of the cell assembly 100. The module BMS 290 may include various sensors and electric circuits to sense temperature and current of the battery module 200. The sensors and circuits are not shown in the drawings.

Meanwhile, the absorption member 220 may be interposed between the at least two cell assemblies 100. The absorption member 220 may be configured to absorb a fire extinguishing liquid when contacting the fire extinguishing liquid supplied into the module housing 210. For example, the absorption member 220 may include a super absorbent polymer, or a super absorbent fiber formed by spinning the super absorbent polymer in a net form.

Figure 10:
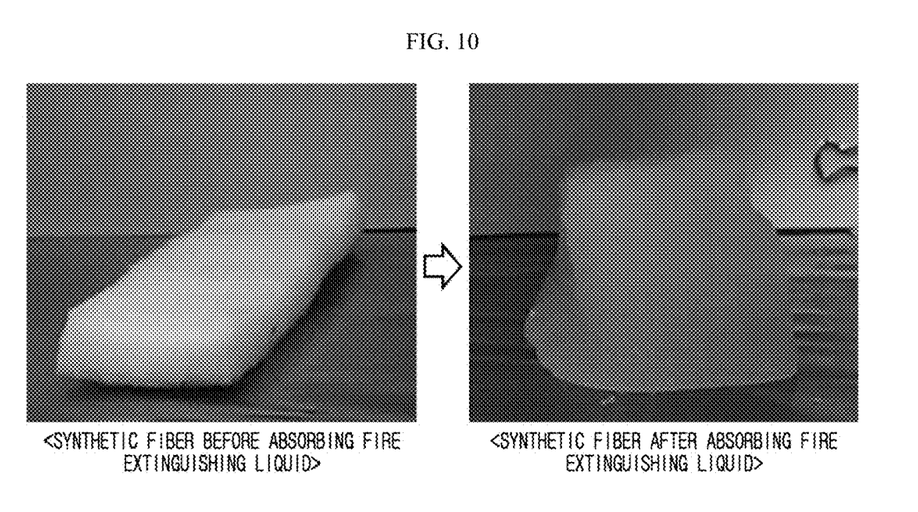
FIG. 10 is photographs schematically showing a synthetic fiber of the battery module according to an embodiment of the present disclosure before and after absorbing a fire extinguishing liquid.

Here, the super absorbent fiber is a fiber made of a super absorbent and has the ability to hold a liquid, so the super absorbent fiber absorbs a liquid not to flow well. Also, the super absorbent fiber has no odor and is in the form of textile fiber. For example, the photographs in FIG. 10 show the state before and after the synthetic fiber with high absorbency absorbs water. If the synthetic fiber absorbs water, its volume may be increased.

Here, the super absorbent fiber may be configured to absorb a fire extinguishing liquid (water) weighing about 500 to 1,000 times of its own weight. Accordingly, the volume of the synthetic fiber may be expanded at least three times or more. For example, the super absorbent polymer may include at least one of starch-based, cellulose-based and synthetic polymer-based materials.

Here, the battery module 200 may be configured to supply a fire extinguishing liquid into the battery module 200 when a fire or thermal runaway occurs at the cell assembly 100. For example, the fire extinguishing liquid may be a concentrated solution of an inorganic salt such as potassium carbonate, or water. Preferably, the fire extinguishing liquid may be water. For example, referring to FIGS. 1 to 3, the fire extinguishing liquid (not shown) may be injected into the battery module 200 through an injection hole H3 formed in the rear cover 216 of the module housing 210.

In addition, the absorption member 220 may have a front surface or a rear surface having a size corresponding to the front surface or the rear surface of the cell assembly 100. For example, the absorption member 220 may have a size capable of covering the entire surface of the cell assembly 100. That is, when viewed from the front, the cell assembly 100 may have so a sufficient size to be hidden by the absorption member 220 and not be visible.

Thus, according to this configuration of the present disclosure, since the absorption member 220 is interposed between the at least two cell assemblies 100 and configured to absorb the fire extinguishing liquid when contacting the fire extinguishing liquid supplied into the module housing 210, when the fire extinguishing liquid is supplied into the battery module 200 due to fire or thermal runaway, the absorption member 220 may absorb the fire extinguishing liquid, so the absorption member 220 may form an insulation barrier capable of blocking the transfer of heat between the cell assemblies 100. That is, the absorption member 220 may block heat transfer between the cell assemblies 100. Accordingly, even if fire or thermal runaway occurs in some secondary batteries 110 of one cell assembly 100, it is possible to prevent fire or thermal propagation from occurring at other neighboring cell assemblies 100. By doing so, the safety of the battery module 200 may be effectively increased.

Figure 4:
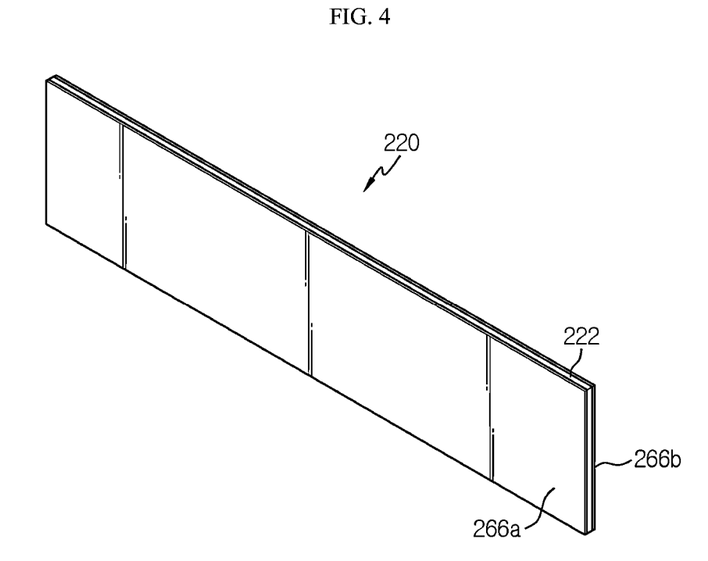
FIG. 4 is a perspective view schematically showing some components of the battery module according to an embodiment of the present disclosure.

FIG. 4 is a perspective view schematically showing some components of the battery module according to an embodiment of the present disclosure. Also, FIG. 5 is an exploded perspective view schematically showing some components of the battery module according to an embodiment of the present disclosure.

Figure 5:
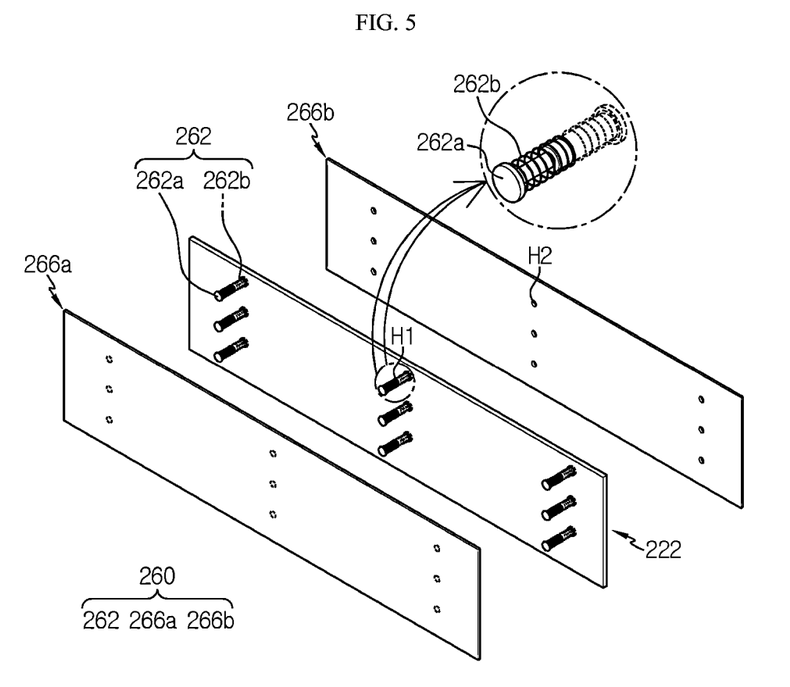
FIG. 5 is an exploded perspective view schematically showing some components of the battery module according to an embodiment of the present disclosure.

Referring to FIGS. 4 and 5 along with FIGS. 2 and 3, the absorption member 220 may include a synthetic fiber 222. The synthetic fiber 222 may have a rectangular pad shape. Front and rear surfaces of the synthetic fiber 222 may have a size corresponding to the front surface or the rear surface of the cell assembly 100. When absorbing a fire extinguishing liquid, the synthetic fiber 222 may cause volume expansion to change its size. In addition, the synthetic fiber 222 may have elasticity so as to be deformed according to pressure.

Moreover, the synthetic fiber 222 may be configured to absorb the fire extinguishing liquid. The synthetic fiber 222 may include a super absorbent fiber formed by spinning a super absorbent polymer in a net form. Here, the super absorbent polymer may be configured to absorb the fire extinguishing liquid (water) of about 500 to 1,000 times of its own weight. For example, the super absorbent polymer may be a super absorbent polymer product of LG Chem. For example, the synthetic fiber 222 may be manufactured by polymerizing acrylic acid and methyl acrylate serving as raw materials in water in a batch, then extracting the polymerized polymer therefrom, and spinning the polymer in a net form.

Therefore, according to this configuration of the present disclosure, since the absorption member 220 includes the synthetic fiber 222 configured to absorb the fire extinguishing liquid, when a fire extinguishing liquid is supplied into the battery module 200, the absorption member 220 absorbs the fire extinguishing liquid, so the absorption member 220 may form a barrier to block heat transfer between the cell assemblies 100. Accordingly, even if fire or thermal runaway occurs in some secondary batteries 110 of one cell assembly 100, it is possible to prevent fire or thermal propagation from occurring at other neighboring cell assemblies 100. By doing so, the safety of the battery module 200 may be effectively increased.

Referring to FIGS. 4 and 5 again, the battery module 200 according to an embodiment of the present disclosure may further include a pressing member 260. Specifically, the pressing member 260 may include an elastic portion 262 and at least two pressing plates 266a, 266b. Here, the elastic portion 262 may be a component configured to be elastically deformed in length in both directions. More specifically, the elastic portion 262 may include a cylinder 262a configured to vary in length in both directions. The cylinder 262a may include a cylindrical first pillar having a solid shaft and a cylindrical second pillar having a hollow shaft. Both longitudinal ends of the cylinder 262a may have a larger diameter than the solid shaft and the hollow shaft so as to be coupled and fixed to the pressing plates 266a, 266b, respectively. For example, if the length of cylinder 262a in a longitudinal direction decreases as the first pillar and second pillar are coupled, the internal pressure inside the hollow increases, which may generate a pushing force for elongating the cylinder 262a, namely in both directions (longitudinal direction) of the shaft.

In addition, the elastic portion 262 may further include a spring 262b configured to surround the cylinder 262a. The spring 262b can be configured to surround the solid shaft and the hollow shaft of the cylinder 262a. Moreover, the spring 262b may be pressed toward the center of the cylinder 262a in an axial direction by both ends of the cylinder 262a having a large diameter. That is, the spring 262b may be configured to change the length of the spring 262b in the elastic direction according to the change in length of the cylinder 262a. For example, if the length of the cylinder 262a is reduced, the spring 262b provided in the cylinder 262a may be elastically contracted by being pressed by both ends of the cylinder 262a. The spring 262b may be configured to generate an elastic force to elongate the cylinder 262a.

In addition, the pressing plates 266a, 266b may be made of polycarbonate or ABS material. The at least two pressing plates 266a, 266b may be configured such that both ends thereof in both directions are coupled to both ends of the elastic portion 262, respectively. Both ends of the cylinder 262a of the elastic portion 262 may be coupled to the at least two pressing plates 266a, 266b, respectively.

For example, as shown in FIG. 5, the pressing member 260 may include a first pressing plate 266a located at the front and a second pressing plate 266b located at the rear based on the synthetic fiber 222. One end of the cylinder 262a of the elastic portion 262 may be coupled to the first pressing plate 266a, and the other end of the cylinder 262a may be coupled to the second pressing plate 266b. At this time, each of the pressing plates 266a, 266b may have a fixing groove H2 so that one end or the other end of the elastic portion 262 is inserted therein.

For example, as shown in FIG. 5, nine fixing grooves H2 may be formed in each of the first pressing plate 266a and the second pressing plate 266b. One end of the cylinder 262a of the elastic portion 262 may be inserted and fixed in the fixing groove H2 of the first pressing plate 266a, and the other end of the cylinder 262a may be inserted and fixed in the fixing groove H2 of the second pressing plate 266b.

Further, each of the pressing plates 266a, 266b may be configured to block the expansion of the cell assembly 100. That is, the pressing plates 266a, 266b may be configured to press one surface of the cell assembly 100. For example, as shown in FIG. 3, the pressing member 260 may be interposed between the two cell assemblies 100. If the volume expansion of the two cell assemblies 100 occurs, the first pressing plate 266a of the pressing member 260 may press the rear surface of the cell assembly 100 located at the front in a front direction, and the second pressing plate 266b may press the front surface of the cell assembly 100 located at the rear in a rear direction.

Therefore, according to this configuration of the present disclosure, since the pressing member 260 is further provided to include the elastic portion 262 configured to be elastically deformed in both directions and at least two pressing plates 266a, 266b respectively coupled to both ends of the elastic portion 262 in both directions and configured to block the expansion of the cell assembly 100, the pressing member 260 may effectively prevent the cell assembly 100 from expanding. Accordingly, it is possible to suppress the occurrence of side reactions at the cell assembly 100. That is, in the present disclosure, it is possible to extend the service life of the cell assembly 100 by means of the pressing member 260.

Meanwhile, referring to FIG. 5 again along with FIG. 4, the absorption member 220 may be positioned between the at least two pressing plates 266a, 266b. For example, the front surface of synthetic fiber 222 of the absorption member 220 may be configured to face the rear surface of the first pressing plate 266a, and the rear surface of synthetic fiber 222 of the absorption member 220 may be configured to face the front surface of the second pressing plate 266b.

Therefore, according to this configuration of the present disclosure, since the absorption member 220 is positioned between the at least two pressing plates 266a, 266b, the absorption member 220 may stably maintain a state where the pressing plates 266a, 266b are erect. Moreover, if volume expansion occurs as the absorption member 220 absorbs the fire extinguishing liquid, the pressing plates 266a, 266b may more strongly press the cell assembly 100 at which thermal runaway occurs, thereby effectively blocking the expansion of the cell assembly 100 and effectively reducing the progress of thermal runaway.

In addition, the synthetic fiber 222 may have a perforated hole H1 formed therein. The perforated hole H1 may be configured such that a part of the elastic portion 262 is penetrated and positioned therethrough. For example, as shown in FIG. 5, nine perforated holes H1 may be formed in the synthetic fiber 222. The nine elastic portions 262 may be inserted into the nine perforated holes H1, respectively.

Figure 6:
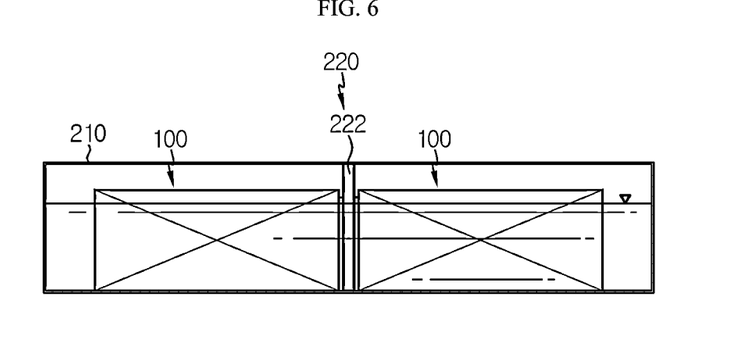
FIG. 6 is a side sectional view schematically showing that a fire extinguishing liquid is introduced into the battery module according to an embodiment of the present disclosure.

FIG. 6 is a side sectional view schematically showing that a fire extinguishing liquid is introduced into the battery module according to an embodiment of the present disclosure.

Referring to FIG. 6, the synthetic fiber 222 of the absorption member 220 of the present disclosure may be configured to contact an inner surface of an outer wall of the module housing 210.

Specifically, the absorption member 220 may be configured such that the synthetic fiber 222 contacts the inner surface of the outer wall of the module housing 210 by volume expansion. That is, if the fire extinguishing liquid (water) is introduced into the battery module 200 since fire or thermal runaway occurs in at least a part of the secondary batteries 110 of the cell assembly 100, the synthetic fiber 222 of the absorption member 220 may absorb the fire extinguishing liquid and deform by causing volume expansion as much as absorbing. The synthetic fiber 222 may be deformed to contact the inner surface of the outer wall of the module housing 210 by volume expansion. For example, as shown in FIG. 6, the upper end of the synthetic fiber 222 of the absorption member 220 may contact the inner surface of the upper cover 212 of the module housing 210.

In addition, when fire or thermal runaway occurs at the cell assembly 100 so that the module housing 210 is heated, the fire extinguishing liquid absorbed by the absorption member 220 may be vaporized by the synthetic fiber 222 in contact with the inner surface of the outer wall of the module housing 210. Accordingly, the absorption member 220 may effectively cool the module housing 210 by generating evaporation heat of the fire extinguishing liquid. Therefore, in the present disclosure, it is possible to prevent the temperature of other neighboring battery modules 200 from rising due to the high-temperature module housing 210, thereby preventing the thermal runaway from being propagated to other battery modules 200 adjacent to the battery module 200 where thermal runaway occurs.

Figure 7:
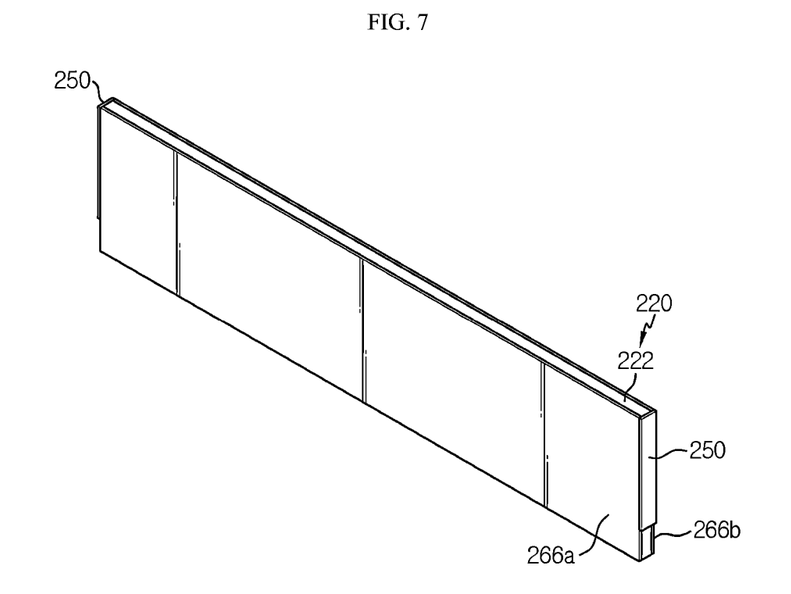
FIG. 7 is a perspective view schematically showing some components of a battery module according to another embodiment of the present disclosure.

FIG. 7 is a perspective view schematically showing some components of a battery module according to another embodiment of the present disclosure.

Referring to FIG. 7 along with FIG. 4, the battery module 200 of FIG. 7 may further include a guide plate 250 provided in the absorption member 220.

Specifically, the guide plate 250 may be configured to guide deformation according to the volume expansion of the synthetic fiber 222. The guide plate 250 may be configured to be in close contact with the left surface and the right surface of the synthetic fiber 222, respectively. For example, as shown in FIG. 7, the absorption member 220 of the present disclosure may include a first guide plate 250 located at the left and a second guide plate 250 located at the right based on the synthetic fiber 222. The first guide plate 250 may be positioned to be coupled to the pressing plates 266a, 266b and a part of the left side of the synthetic fiber 222. The second guide plate 250 may be positioned to be coupled to the pressing plates 266a, 266b and a part of the right side of the synthetic fiber 222. That is, when the volume expansion of the synthetic fiber 222 occurs, the guide plates 250 may block expansion in the left and right direction (X-axis direction), thereby inducing the synthetic fiber 222 to expand upward.

Therefore, according to this configuration of the present disclosure, since the absorption member 220 further includes the guide plate 250 configured to guide appearance deformation according to the volume expansion of the synthetic fiber 222, it is possible to induce the synthetic fiber 222 to deform so that the synthetic fiber 222 may contact the module housing 210 or transmit a pressing force to neighboring cell assemblies 100. Accordingly, it is possible to more effectively prevent heat propagation when fire occurs at the battery module 200.

Figure 8:
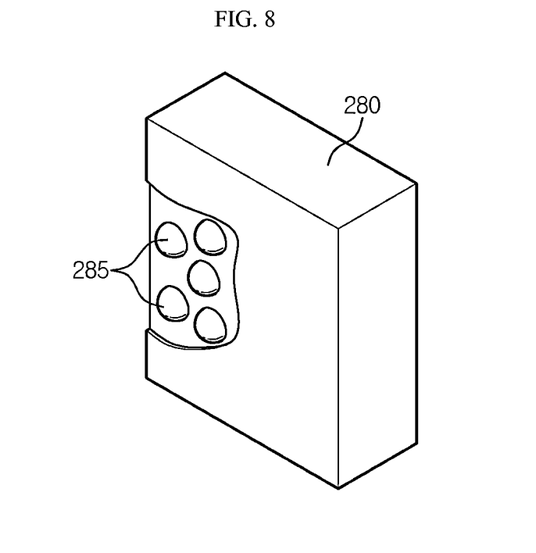
FIG. 8 is a perspective view schematically showing some components of a battery module according to another embodiment of the present disclosure.

FIG. 8 is a perspective view schematically showing some components of a battery module according to another embodiment of the present disclosure.

Referring to FIG. 8 along with FIG. 3, the absorption member 220 of the battery module 200 of FIG. 8 may further include a porous body.

Specifically, the porous body 280 may be configured to absorb the fire extinguishing liquid by using a capillary phenomenon. The porous body 280 may have a porous and spongy shape. For example, the porous body 280 may be a sponge.

In addition, the porous body 280 may be configured to accommodate a plurality of absorption particles 285 therein. Here, the plurality of absorption particles 285 may be a super absorbent polymer. The super absorbent polymer may be configured to absorb the fire extinguishing liquid (water) weighing 500 to 1,000 times of its own weight. Accordingly, the super absorbent polymer may be provided in the form of the plurality of absorption particles 285. If the super absorbent polymer absorbs water, its volume may expand at least three times or more. For example, the super absorbent polymer may include at least one of starch-based, cellulose-based and synthetic polymer-based materials. Moreover, the plurality of absorption particles 285 may be configured to be distributed inside the porous body 280. In this case, the porous body 280 may be configured to absorb the fire extinguishing liquid and deliver the fire extinguishing liquid to the plurality of absorption particles 285 accommodated therein when contacting the fire extinguishing liquid.

In addition, the porous body 280 may be configured to be interposed between the pressing plates 266a, 266b. The porous body 280 may have the front surface and the rear surface having a size corresponding to the front surface and the rear surface of the pressing plates 266a, 266b, respectively.

Therefore, according to this configuration of the present disclosure, since the absorption member 220 further includes a porous body 280 having a porous and sponge form and configured to absorb the fire extinguishing liquid and a plurality of absorption particles configured to absorb the fire extinguishing liquid, the speed of the absorption member 220 to absorb the fire extinguishing liquid may be effectively increased. Accordingly, the absorption member 220 may quickly block heat transfer between the at least two cell assemblies 100. Ultimately, in the present disclosure, it is possible to effectively prevent fire or thermal runaway from being propagated between the cell assemblies 100.

Referring to FIG. 2 again, the battery module 200 of the present disclosure may further include a module BMS 290 configured to control charging and discharging of the cell assembly 100. The module BMS 290 may include various sensors and electric circuits to sense temperature and current of the battery module 200. The sensors and circuits are not shown in the drawings.

Meanwhile, the bus bar assembly 270 may include at least one bus bar 272 and at least one bus bar frame 276 to which the bus bar 272 is mounted.

Specifically, the bus bar 272 may be an alloy containing a metal such as copper, nickel or aluminum with excellent electrical conductivity. The bus bar 272 may be configured to electrically connect the plurality of secondary batteries 110 to each other. That is, the bus bar 272 may be configured to contact a part of the electrode lead 111. The bus bar 272 may have a plate shape. For example, as shown in FIG. 2, the bus bar 272 may have a plate shape extending in front and rear directions and in upper and lower directions.

In addition, the bus bar frame 276 may include an electrically insulating material. For example, the bus bar frame 276 may have a plastic material. More specifically, the plastic material may be polyvinyl chloride.

For example, as shown in FIG. 2, the battery module 200 may include four bus bar assemblies 270. The bus bar assemblies 270 may be located at left and right sides of the cell assembly 100, respectively. Each of the four bus bar assemblies 270 may include four bus bars 272, and a bus bar frame 276 at an outer side of which the four bus bars 272 are mounted.

Figure 9:
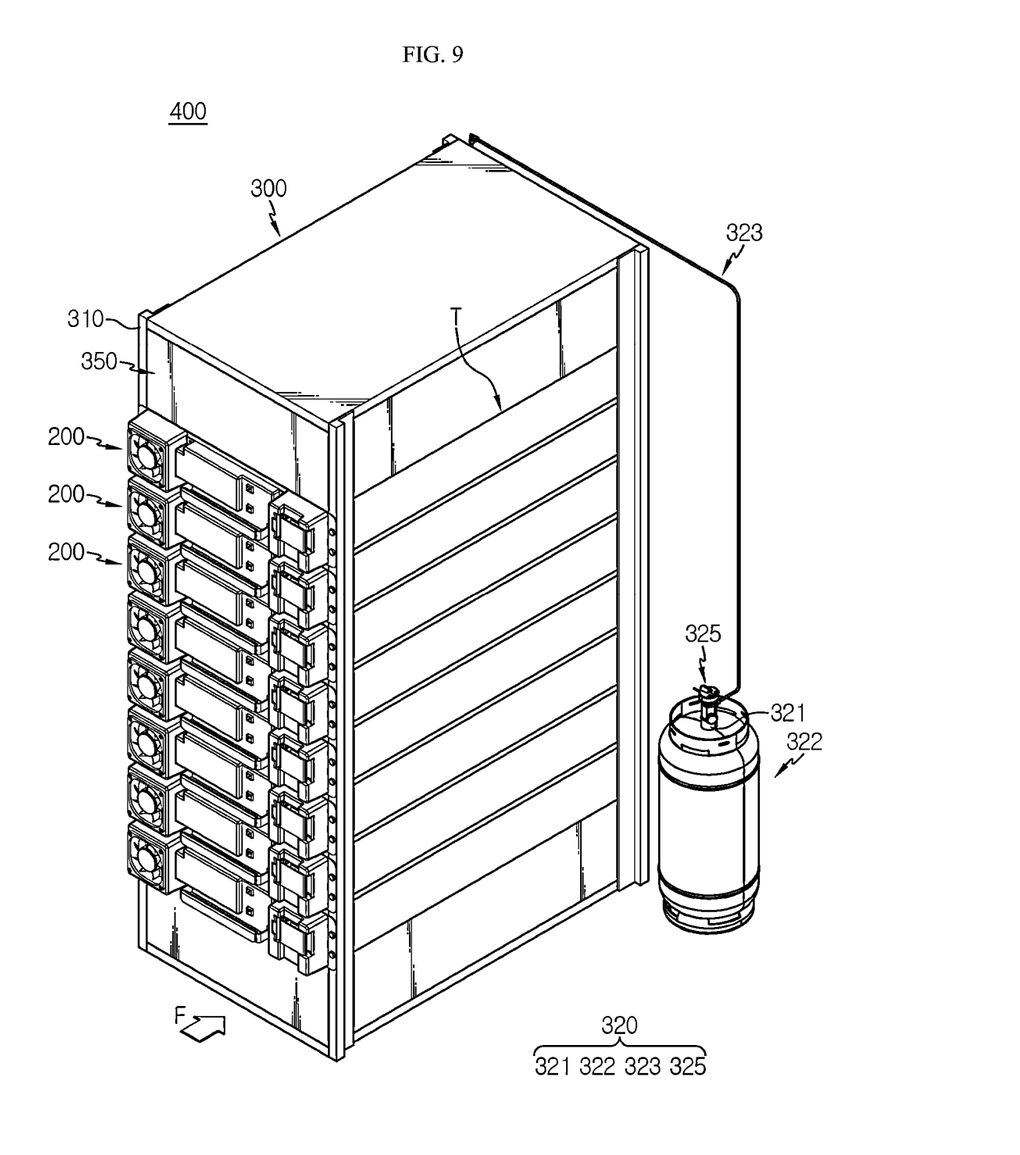
FIG. 9 is a perspective view schematically showing an energy storage system according to an embodiment of the present disclosure.

FIG. 9 is a perspective view schematically showing an energy storage system according to an embodiment of the present disclosure.

Referring to FIG. 9, the energy storage system 400 according to an embodiment of the present disclosure may include at least one battery rack 300. The two or more battery racks 300 may be arranged in one direction.

In addition, the battery rack 300 according to an embodiment of the present disclosure may include at least one the battery module 200, and a fire extinguishing unit 320. In addition, the battery rack 300 may include a rack case 310 that accommodates the at least one battery module 200 therein.

Specifically, the fire extinguishing unit 320 may include a fire extinguishing tank 322, a pipe 323, and a fire extinguishing valve 325.

First, the fire extinguishing tank 322 may accommodate the fire extinguishing liquid (not shown) therein. For example, the fire extinguishing tank 322 may have a capacity of 59 L, the compressed gas may be 8 bar of nitrogen, and the fire extinguishing liquid may be 40 L of water. Here, if water is used as the fire extinguishing liquid, when water is sprayed inside the battery module 200, the water has a heat-resistance effect as well as a fire extinguishing and cooling effect, which is particularly effective in preventing thermal propagation when high-temperature gas and flame are generated due to the thermal runaway. Accordingly, it is possible to effectively prevent the fire or thermal runaway from propagating between the plurality of battery modules 200.

In addition, the pipe 323 may be configured to be connected to supply the fire extinguishing liquid from the fire extinguishing tank 322 to each of the at least two battery modules 200. For example, the pipe 323 may have a material that is not corroded by water. For example, the pipe 323 may have stainless steel. The pipe 323 may be configured to have one end connected to a discharge hole 321 of the fire extinguishing tank 322. The other end of the pipe 323 may have a shape extending to the inside of each of the at least two battery modules 200.

For example, the pipe 323 may be connected to the discharge hole 321 through which the fire extinguishing liquid of the fire extinguishing tank 322 is discharged. For example, as shown in FIGS. 1 and 2, the pipe 323 may be connected to the discharge hole 321 of the fire extinguishing tank 322.

Moreover, the fire extinguishing valve 325 may be configured to supply the fire extinguishing liquid from the fire extinguishing tank 322 into the battery module 200 when the internal gas (air) of the battery module 200 is heated above a predetermined temperature. That is, the fire extinguishing valve 325 may be configured to open an outlet so that the fire extinguishing liquid may be injected into the battery module 200 over a predetermined temperature. The fire extinguishing valve 325 may be an active valve capable of controlling the valve to be opened or closed by receiving a signal from the fire extinguishing unit 320. More specifically, the active valve may be a control valve, an electric valve, a solenoid valve, or a pneumatic valve.

Moreover, the active valve may be configured to supply the fire extinguishing liquid from the fire extinguishing tank 322 to the battery module 200 whose internal temperature rises above a predetermined temperature. If the internal temperature of the battery module 200 is higher than a predetermined temperature, the control unit 350 located under the top plate may sense the internal temperature so that the active valve is actively opened by the control unit 350. In this case, the control unit 350 may be located on the battery module 200 provided at the top portion T of the plurality of battery modules 200.

The fire extinguishing unit 320 may include the control unit 350. Specifically, the control unit 350 may be configured to open the active valve when a temperature higher than the predetermined temperature is sensed by a temperature sensor. For example, the control unit 350 may be configured to transmit a signal for controlling the active valve.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
| --- | --- |
| 200: battery module | 100: cell assembly |
| 110: secondary battery | 210: module housing |
| 220: absorption member | 222: synthetic fiber |
| 250: guide plate | |
| 260: pressing member | 262, 266: elastic portion, pressing plate |
| 270: bus bar assembly | 272, 276: bus bar, bus bar frame |
| H1: perforated hole | H2: fixing groove |
| 280: porous body | 285: absorption particle |
| 320: fire extinguishing unit | 325: fire extinguishing valve |
| 322: fire extinguishing tank | 323: pipe |
| 300: battery rack | 400: energy storage system |

What is claimed is:

1. A battery module, comprising:
   at least two cell assemblies, each cell assembly of the at least two cell assemblies having a plurality of secondary batteries;
   a module housing having an inner space formed to accommodate the at least two cell assemblies therein; and
   an absorption member interposed between the at least two cell assemblies and configured to absorb a fire extinguishing liquid when contacting the fire extinguishing liquid supplied into the module housing,
   wherein the battery module further comprises a pressing member that includes an elastic portion configured to elastically deform in opposite directions relative to the pressing member, and at least two pressing plates coupled to ends of the elastic portion and configured to block expansion of the at least two cell assemblies.

2. The battery module according to claim 1, wherein the absorption member includes a synthetic fiber configured to absorb the fire extinguishing liquid.

3. The battery module according to claim 2, wherein the synthetic fiber have volume expansion when absorbing the fire extinguishing liquid, and
wherein the synthetic fiber is configured to contact an inner surface of an outer wall of the module housing due to the volume expansion.

4. The battery module according to claim 3, wherein each of the plurality of secondary batteries is a pouch-type secondary battery.

5. The battery module according to claim 1, wherein the absorption member is located between the at least two pressing plates.

6. The battery module according to claim 1, wherein the absorption member further includes a guide plate configured to guide deformation of the absorption member according to the volume expansion of the synthetic fiber.

7. The battery module according to claim 1, wherein the synthetic fiber has a hole so that a part of the elastic portion is located therethrough, and
wherein the pressing plate has a fixing groove so that an end of the elastic portion is inserted therein.

8. The battery module according to claim 1, wherein the absorption member includes:
a porous body having a porous and spongy form and configured to absorb the fire extinguishing liquid; and
a plurality of absorption particles distributed inside the porous body and configured to absorb the fire extinguishing liquid.

9. A battery rack, comprising:
at least one battery module according to claim 1; and
a fire extinguisher including a fire extinguishing tank configured to contain a fire extinguishing liquid therein, a pipe connected from the fire extinguishing tank to the at least one battery module to supply the fire extinguishing liquid, and a fire extinguishing valve configured to open an outlet when an internal gas of the battery module is heated over a predetermined temperature so that the fire extinguishing liquid is supplied from the fire extinguishing tank into the battery module.

10. An energy storage system, comprising at least one battery rack according to claim 9.

* * * * *